United States Patent
Chen et al.

(10) Patent No.: US 11,226,651 B2
(45) Date of Patent: Jan. 18, 2022

(54) ELECTRONIC DEVICE

(71) Applicant: Acer Incorporated, New Taipei (TW)

(72) Inventors: Chia-Bo Chen, New Taipei (TW); Cheng-Nan Ling, New Taipei (TW); Wu-Chen Lee, New Taipei (TW); Yi-Hsuan Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 3 days.

(21) Appl. No.: 16/889,721

(22) Filed: Jun. 1, 2020

(65) Prior Publication Data

US 2021/0200269 A1 Jul. 1, 2021

(30) Foreign Application Priority Data

Dec. 30, 2019 (TW) .................................. 108148387

(51) Int. Cl.
*G06F 1/16* (2006.01)

(52) U.S. Cl.
CPC .......... *G06F 1/1624* (2013.01); *G06F 1/1662* (2013.01); *G06F 1/1681* (2013.01)

(58) Field of Classification Search
CPC ..... G06F 1/1624; G06F 1/1662; G06F 1/1681
See application file for complete search history.

(56) References Cited

U.S. PATENT DOCUMENTS

| | | | | |
|---|---|---|---|---|
| 10,627,874 B2* | 4/2020 | Lin | ...................... | G06F 1/1681 |
| 10,921,863 B2* | 2/2021 | Gault | .................... | G06F 1/1656 |
| 2020/0133336 A1* | 4/2020 | Wang | .................... | G06F 1/1616 |
| 2021/0041915 A1* | 2/2021 | Moser | .................. | G06F 1/1605 |

FOREIGN PATENT DOCUMENTS

| | | |
|---|---|---|
| CN | 102096444 | 6/2011 |
| TW | 200928678 | 7/2009 |
| TW | M368277 | 11/2009 |
| TW | 201024981 | 7/2010 |
| WO | 2019240788 | 12/2019 |

\* cited by examiner

*Primary Examiner* — Rockshana D Chowdhury
(74) *Attorney, Agent, or Firm* — JCIPRNET

(57) ABSTRACT

An electronic device includes a host, a main display, an auxiliary display, and a hinge mechanism. The auxiliary display is located between the host and the main display and includes a sliding part and a lifting part. The sliding part is slidably connected to the host. The hinge mechanism includes a first bracket, a second bracket pivotally connected to the first bracket, and a third bracket pivotally connected to the second bracket. The first bracket is secured to the host, and the second bracket is secured to the main display. The third bracket is secured to the lifting part of the auxiliary display.

10 Claims, 3 Drawing Sheets

ELECTRONIC DEVICE

CROSS-REFERENCE TO RELATED APPLICATION

This application claims the priority benefit of Taiwan patent application serial no. 108148387, filed on Dec. 30, 2019. The entirety of the above-mentioned patent application is hereby incorporated by reference herein and made a part of this specification.

BACKGROUND

Technical Field

The disclosure relates to an electronic device, and more particularly, to an electronic device including a main display and an auxiliary display.

Description of Related Art

Notebook computers characterized by multiplexing capabilities, high computing performance, and portability have become indispensable to modern people. Generally speaking, the notebook computer includes a host and a display, wherein the display is pivotally connected to the host, and a keyboard assembly is integrated to the host.

To improve operation flexibility for users, a notebook computer having an auxiliary display integrated to the host has been launched. In detail, the auxiliary display and the keyboard assembly are located on the same working plane, and the auxiliary display and the keyboard assembly are juxtaposed. Since the angle and the height of the auxiliary display cannot be adjusted in most cases, it often brings inconvenience to the users as well as easily causes eye fatigue.

SUMMARY

The disclosure provides an electronic device characterized by operation flexibility.

According to an embodiment of the disclosure, an electronic device including a host, a main display, an auxiliary display, and a hinge mechanism is provided. The auxiliary display is located between the host and the main display and includes a sliding part and a lifting part. The sliding part is slidably connected to host. The hinge mechanism includes a first bracket, a second bracket pivotally connected to the first bracket, and a third bracket pivotally connected to the second bracket. The first bracket is secured to the host, and the second bracket is secured to the main display. The third bracket is secured to the lifting part of the auxiliary display.

Based on the above, the auxiliary display is integrated into the electronic device provided in one or more embodiments of the disclosure, and the angle and the height of the auxiliary display are adjustable, so that users may easily operate the auxiliary display, and that users' comfort of using the auxiliary display may be improved.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
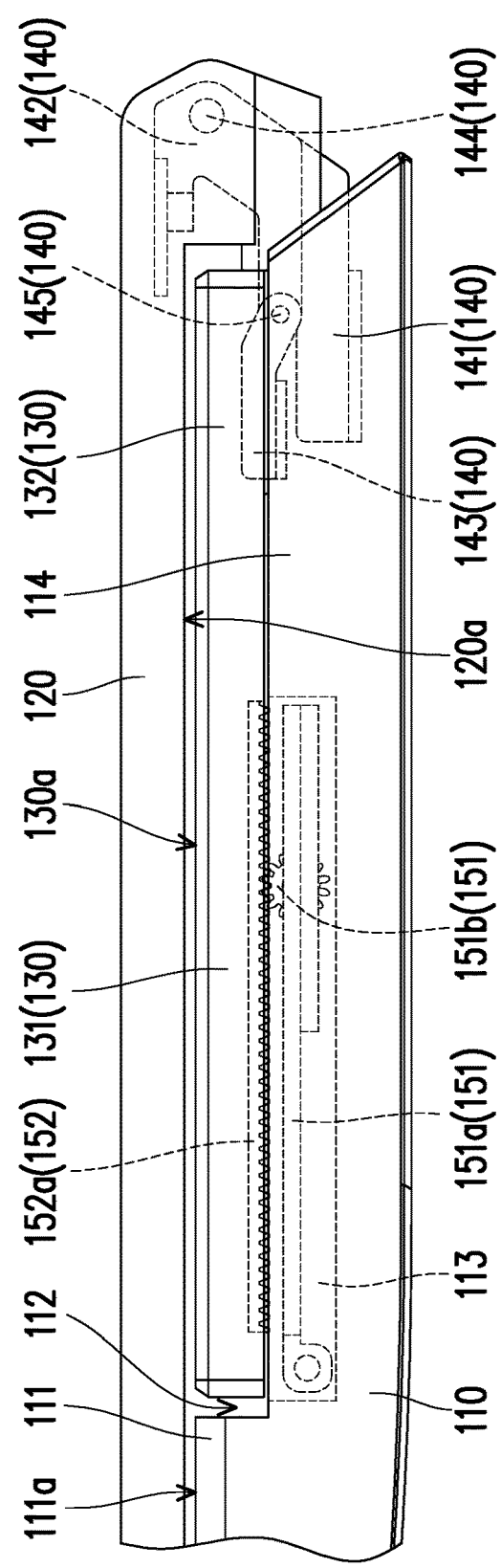
FIG. 1 is a schematic partial side view of an electronic device in a folded state according to an embodiment of the disclosure.
Figure 2:
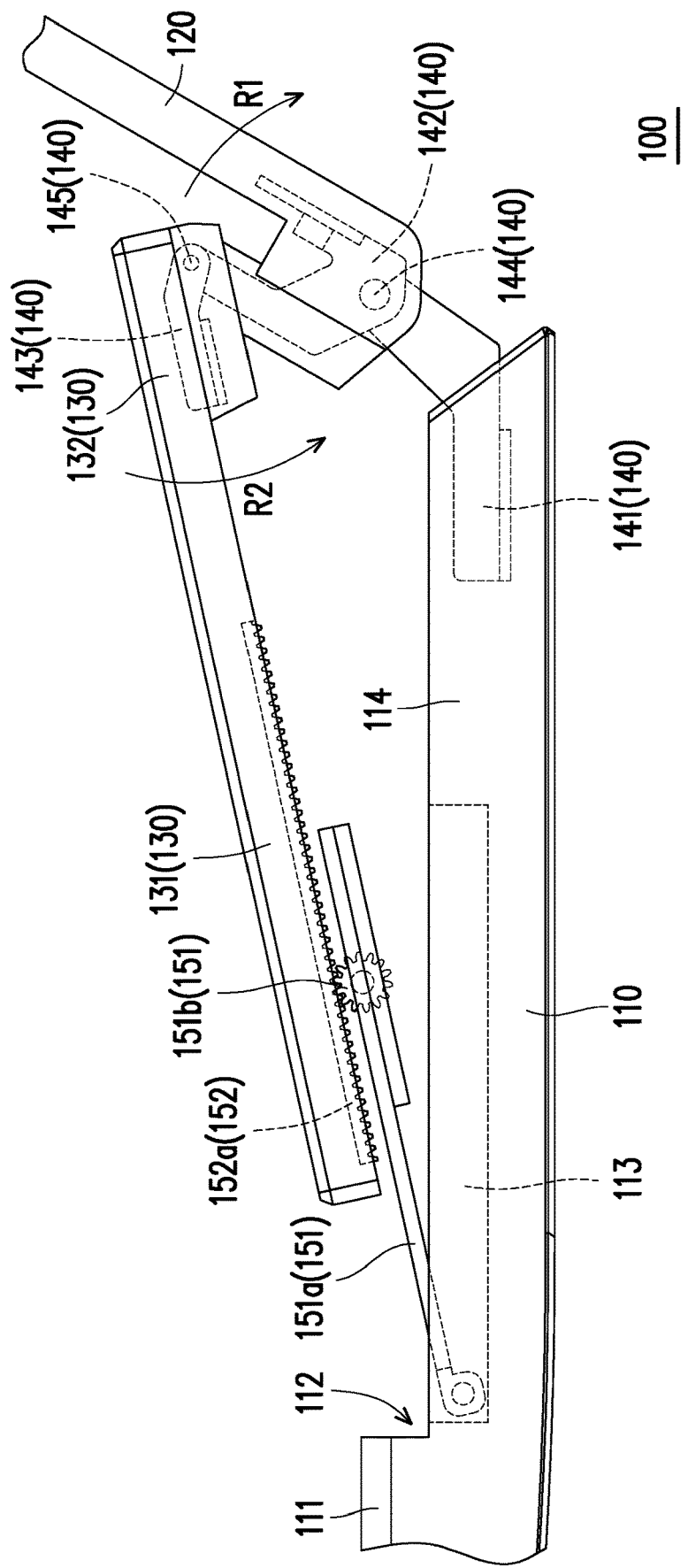
FIG. 2 is a schematic partial side view of an electronic device in a first unfolded state according to an embodiment of the disclosure.
Figure 3:
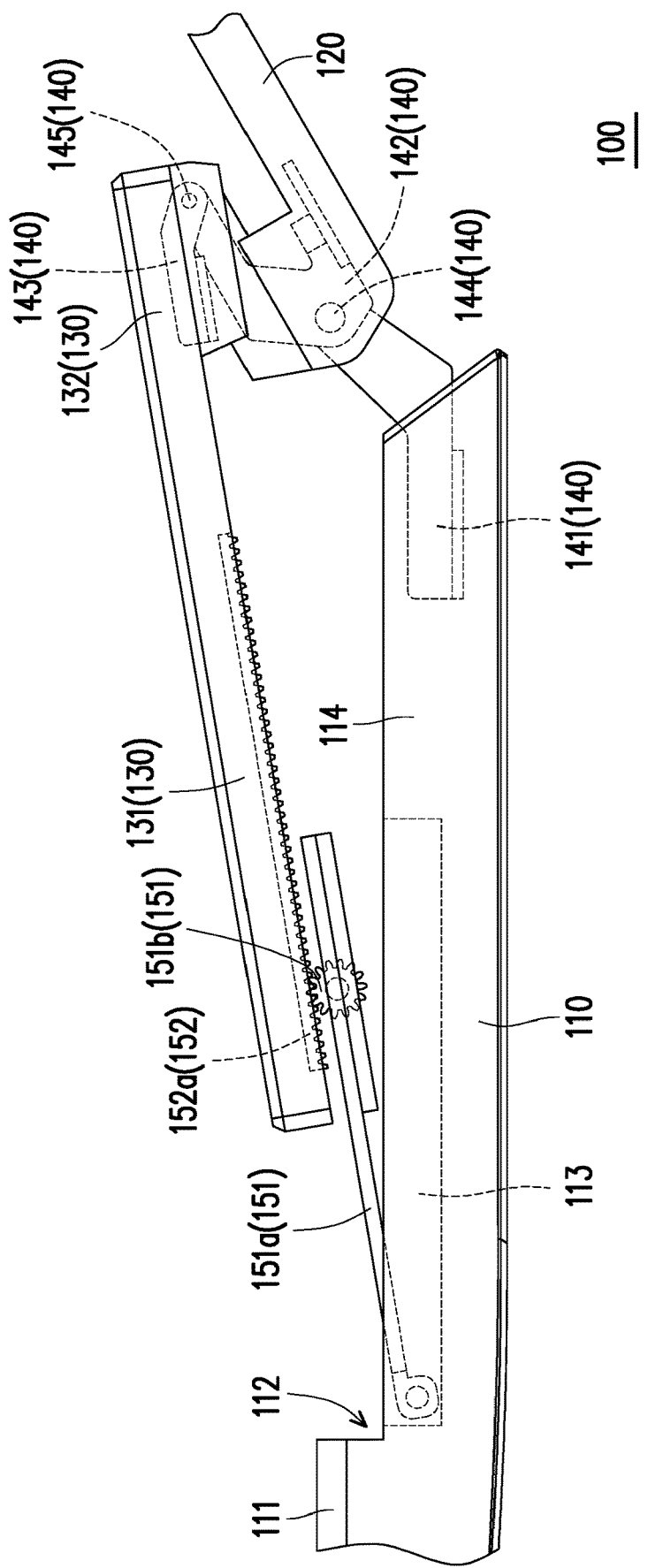
FIG. 3 is a schematic partial side view of an electronic device in a second unfolded state according to an embodiment of the disclosure.

FIG. 1 is a schematic partial side view of an electronic device in a folded state according to an embodiment of the disclosure. FIG. 2 is a schematic partial side view of an electronic device in a first unfolded state according to an embodiment of the disclosure. FIG. 3 is a schematic partial side view of an electronic device in a second unfolded state according to an embodiment of the disclosure. With reference to FIG. 1 and FIG. 2, in this embodiment, an electronic device 100 may be a notebook computer and includes a host 110, a main display 120, an auxiliary display 130, and a hinge mechanism 140. The host 110 is configured to perform logical operations, signal control, and data access, and the main display 120 and auxiliary display 130 are electrically connected to the host 110. On the other hand, the main display 120 and the auxiliary display 130 are configured to display images, and the auxiliary display 130 may be integrated with a touch function to facilitate users' operations. In other exemplary embodiments, the main display 120 may be integrated with the touch function.

The main display 120 is connected to the host 110 through the hinge mechanism 140 to be rotatably folded or unfolded with respect to the host 110. On the other hand, the auxiliary display 130 is connected to the main display 120 through the hinge mechanism 140. When the main display 120 is rotatably folded or unfolded with respect to the host 110, the hinge mechanism 140 drives the auxiliary display 130 to ascend or descend with respect to the host 110.

When the main display 120 is in a folded state as shown in FIG. 1, the main display 120 covers the host 110, and the auxiliary display 130 is located between the main display 120 and the host 110. On the other hand, a display surface 120a of the main display 120 faces a display surface 130a of the auxiliary display 130, and the display surface 120a of the main display 120 and the display surface 130a of the auxiliary display 130 are hidden inside, so as to protect the display surface 120a of the main display 120 and the display surface 130a of the auxiliary display 130 from being damaged by external forces or foreign objects.

As shown in FIG. 1 and FIG. 2, in this embodiment, the auxiliary display 130 includes a sliding part 131 and a lifting part 132, wherein the sliding part 131 is slidably connected to the host 110, and the lifting part 132 is connected to the hinge mechanism 140. In detail, the hinge mechanism 140 includes a first bracket 141, a second bracket 142 pivotally connected to the first bracket 141, and a third bracket 143 pivotally connected to the second bracket 142, wherein the first bracket 141 is secured to the host 110, and the second bracket 142 is secured to the main display 120. On the other hand, the third bracket 143 is secured to the lifting part 132 of the auxiliary display 130. When the main display 120 is rotatably folded or unfolded with respect to the host 110, the second bracket 142 is rotated with respect to the first bracket 141 and drives the third bracket 143, so that the third bracket 143 is driven to move the auxiliary display 130 up or down with respect to the host 110 and move the auxiliary display 130 to slide with respect to the host 110.

During the process of folding and unfolding the main display 120 with respect to the host 110, the hinge mechanism 140 may synchronously drive the auxiliary display 130 to ascend or descend. Therefore, from the users' perspective, the operation of the electronic device 100 is simple and intuitive. In another aspect, the angle and the height of the auxiliary display 130 are adjustable, so that users may easily operate the auxiliary display 130, and that users' comfort of using the auxiliary display 130 may be improved.

The host 110 includes a keyboard assembly 111, and the keyboard assembly 111 and the auxiliary display 130 are juxtaposed. The hinge mechanism 140 is away from the keyboard assembly 111. Further, the sliding part 131 is close to the keyboard assembly 111, and the lifting part 132 is away from the keyboard assembly 111. That is, the sliding part 131 is located between the keyboard assembly 111 and the lifting part 132. In another aspect, the host 110 has a first groove 112 for accommodating the auxiliary display 130, and the first groove 112 and the keyboard assembly 111 are juxtaposed. This is conducive to the improvement of the appearance integrity of the electronic device 100, so as to comply with the product requirements for thin design.

The keyboard assembly 111 has an operation surface 111a. When the auxiliary display 130 is disposed in the first groove 112, the display surface 130a of the auxiliary display 130 is coplanar with or slightly lower than the operation surface 111a of the keyboard assembly 111, so as to prevent the main display 120 covering the host 110 from squeezing the auxiliary display 130.

In this embodiment, the hinge mechanism 140 further includes a first rotation axle 144 and a second rotation axle 145, and the first rotation axle 144 and the second rotation axle 145 are parallel to each other. In detail, the second bracket 142 is pivotally connected to the first bracket 141 through the first rotation axle 144, and the third bracket 143 is pivotally connected to the second bracket 142 through the second rotation axle 145. For instance, the first rotation axle 144 and the second rotation axle 145 are integrated with torque accessories, so as to prevent the main display 120 and the auxiliary display 130 from falling instantly.

Please refer to FIG. 1 to FIG. 3. When the main display 120 rotates with respect to the host 110 and is unfolded, the position of the first rotation axle 144 remains unchanged. The first rotation axle 144 serves as the rotation reference axle of the second bracket 142, and the second bracket 142 rotates along a first rotation direction R1 with respect to the first bracket 141 (i.e., the main display 120 rotates along the first rotation direction R1 with respect to the host 110). At the same time, the second bracket 142 drives the third bracket 143 to be lifted with respect to the host 110, and drives the lifting part 132 of the auxiliary display 130.

While the third bracket 143 and the auxiliary part 132 of the auxiliary display 130 are being lifted with respect to the host 110, the second rotation axle 145 gradually moves up and away from the keyboard assembly 111, and the sliding part 131 of the auxiliary display 130 slides with respect to the host 110 and moves away from the keyboard assembly 111. The second rotation axle 145 serves as the rotation reference axle of the third bracket 143. The third bracket 143 is configured to rotate along a second rotation direction R2 with respect to the second bracket 142 (i.e., the auxiliary display 130 rotates along the second rotation direction R2 with respect to the main display 120), and the second rotation direction R2 is opposite to the first rotation direction R1.

In a first unfolded state shown in FIG. 2, the auxiliary display 130 has the maximum lifting angle and the maximum lifting height, and the second rotation axle 145 is located at the highest point in the entire movement path. If the main display 120 is continuously rotated in the first rotation direction R1 with respect to the host 110, the lifting part 132 of the auxiliary display 130 is rotated in the second rotation direction R2 with respect to the main display 120 and slightly sinks to prevent the display surface 120a of the main display 120 from being blocked, and the sliding part 131 of the auxiliary display 130 continues to slide away from the keyboard assembly 111, as shown in FIG. 3.

During the transition from the first unfolded state shown in FIG. 2 to a second unfolded state shown in FIG. 3, the second rotation axle 145 descends from the highest point and continues to move away from the keyboard assembly 111.

As shown in FIG. 1 to FIG. 3, in this embodiment, the electronic device 100 further includes a sliding mechanism 150, and the sliding mechanism 150 is disposed between the auxiliary display 130 and the host 110. In detail, the sliding mechanism 150 includes a pivoting member 151 and a sliding member 152, wherein the pivoting member 151 is pivotally connected to the host 110, and a pivoting point where the pivoting member 151 is pivotally connected to the host 110 is close to the keyboard assembly 111. The sliding member 152 is slidably connected to the pivoting member 151, and the sliding member 152 is connected to the sliding part 131 of the auxiliary display 130. While the auxiliary display 130 is ascending or descending, the auxiliary display 130 drives the pivoting member 151 to rotate with respect to the host 110 and to slide with respect to the pivoting member 151 through the sliding member 152, so as to slide away from or close to the keyboard assembly 111.

Further, the pivoting member 151 includes a base 151a and a gear 151b, one end of the base 151a is pivotally connected to the host 110, and the gear 151b is pivoted to the other end of the base 151a. In another aspect, the sliding member 152 is located on one side of the auxiliary display 130 facing against the display surface 130a, and the sliding member 152 includes a rack 152a. The rack 152a is fixed to the sliding part 131 of the auxiliary display 130, and the gear 151b is engaged with the rack 152a.

According to this embodiment, the host 110 further has a second groove 113 communicating with the first groove 112, and the second groove 113 is connected to a bottom surface of the first groove 112. The second groove 113 is configured to accommodate the sliding mechanism 150 and can comply with the product requirements for thin design. In another aspect, the host 110 also includes a heat dissipating part 114 located in the first groove 112. The heat dissipating part 114 is located on one side of the second groove 113, and the auxiliary display 130 overlaps the heat dissipating part 114. After the auxiliary display 130 is lifted, the heat dissipating part 114 is exposed to the outside, so as to improve heat dissipation efficiency.

To sum up, the auxiliary display is integrated into the electronic device provided in one or more embodiments of the disclosure, and the angle and the height of the auxiliary display are adjustable, so that users may easily operate the auxiliary display, and that users' comfort of using the auxiliary display may be improved. Furthermore, during the process of folding and unfolding the main display with respect to the host, the hinge mechanism drives the auxiliary display to ascend or descend with respect to the host and to slide with respect to the host, and thus the operation is simple and intuitive. In other words, the users need not manually adjust the angle and the height of the auxiliary display. In another aspect, when the auxiliary display is lifted with respect to the host, the heat dissipating part of the host is exposed to the outside, so as to improve heat dissipation efficiency.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a host;
   a main display
   an auxiliary display, located between the host and the main display, wherein the auxiliary display comprises a sliding part and a lifting part, and the sliding part is slidably connected to the host; and
   a hinge mechanism, comprising a first bracket, a second bracket rotatable with respect to the first bracket, and a third bracket rotatable with respect to the second bracket, wherein the first bracket is secured to the host, the second bracket is secured to the main display, and the third bracket is secured to the lifting part of the auxiliary display.

2. The electronic device according to claim 1, wherein the hinge mechanism further comprises a first rotation axle and a second rotation axle, the first rotation axle and the second rotation axle are parallel to each other, the second bracket is pivotally connected to the first bracket through the first rotation axle, and the third bracket is pivotally connected to the second bracket through the second rotation axle.

3. The electronic device according to claim 1, further comprising:
   a sliding mechanism disposed between the auxiliary display and the host, wherein the sliding mechanism comprises a pivoting member and a sliding member, the pivoting member is pivotally connected to the host, the sliding member is slidably connected to the pivoting member, and the sliding member is connected to the sliding part of the auxiliary display.

4. The electronic device according to claim 3, wherein the host has a first groove and a second groove communicating with the first groove, the first groove is configured to accommodate the auxiliary display, and the second groove is configured to accommodate the sliding mechanism.

5. The electronic device according to claim 3, wherein the pivoting member comprises a base and a gear pivoted to the base, the base is pivotally connected to the host, the sliding member comprises a rack, the rack is fixed to the sliding part of the auxiliary display, and the gear is engaged with the rack.

6. The electronic device according to claim 1, wherein the host comprises a keyboard assembly, the keyboard assembly and the auxiliary display are juxtaposed, and the sliding part is located between the keyboard assembly and the lifting part.

7. The electronic device according to claim 6, wherein the host has a groove, the groove and the keyboard assembly are juxtaposed, the auxiliary display has a display surface, the keyboard assembly has an operation surface, the auxiliary display is disposed in the groove, and the display surface is coplanar with the operation surface.

8. The electronic device according to claim 1, wherein the host has a groove, and the auxiliary display is disposed in the groove.

9. The electronic device according to claim 8, wherein the host comprises a heat dissipating part located in the groove, and the auxiliary display overlaps the heat dissipating part.

10. The electronic device according to claim 1, wherein a rotation direction of the main display is opposite to a rotation direction of the auxiliary display.

* * * * *